E. H. SCHILD.
EYEGLASSES.
APPLICATION FILED JUNE 20, 1901. RENEWED SEPT. 13, 1907.
920,666.
Patented May 4, 1909.
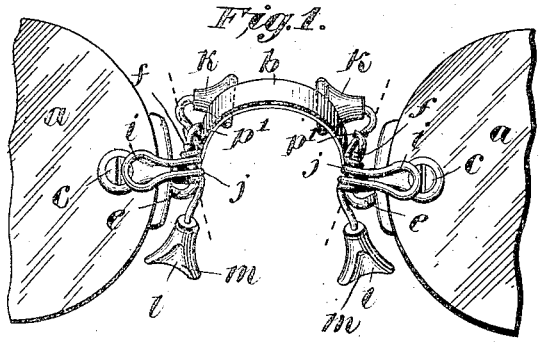
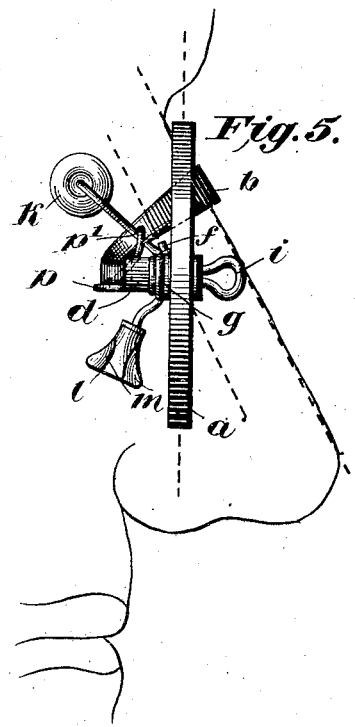
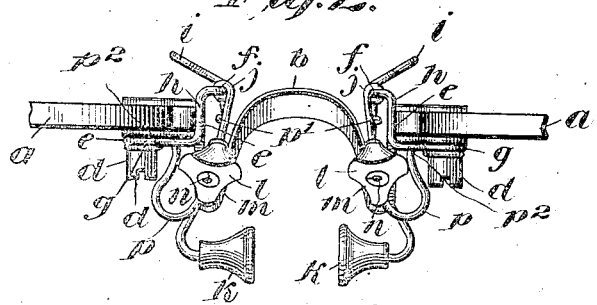
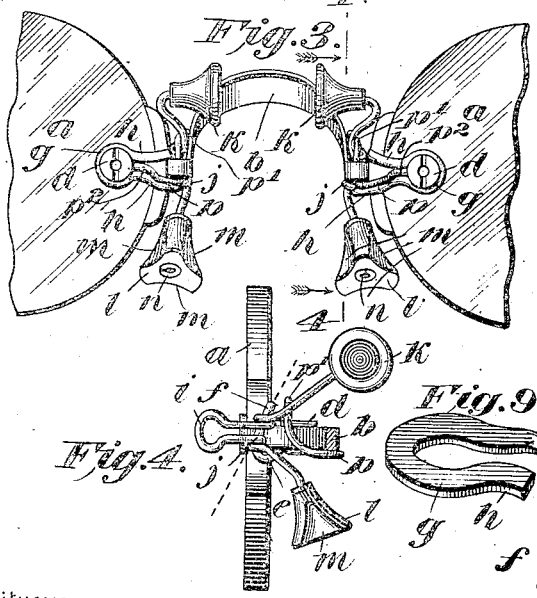
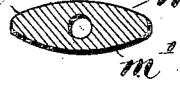
Witnesses:
Elmer Seavey,
J. A. E. Criswell.
Inventor,
Edward H. Schild,
By Davis & Davis.
Attorneys

UNITED STATES PATENT OFFICE.

EDWARD H. SCHILD, OF BALTIMORE, MARYLAND, ASSIGNOR TO LEO F. ADT, OF ALBANY, NEW YORK.

EYEGLASSES.

No. 920,666.      Specification of Letters Patent.      Patented May 4, 1909.

Application filed June 20, 1901, Serial No. 65,320. Renewed September 13, 1907. Serial No. 392,770.

*To all whom it may concern:*

Be it known that I, EDWARD H. SCHILD, a citizen of the United States of America, and resident of Baltimore, State of Maryland, have invented certain new and useful Improvements in Eyeglasses, of which the following is a specification, reference being had therein to the accompanying drawings, in which—

Figure 1 is a front view of a pair of eyeglasses provided with one embodiment of my invention; Fig. 2 is a view thereof looking at the lower edges of the lenses; Fig. 3 is a view of the inner side thereof; Fig. 4 a transverse section taken on the line 4—4 of Fig. 3; Fig. 5 an end elevation showing its position on the nose; Fig. 6 detail views of the lower tip of the nose guard; Fig. 7 a detail section of the upper tip; Fig. 8 a detail view of one of the levers carrying the nose grasping tips; Fig. 9 a detail view of one of the pivot-pin brackets; and, Fig. 10 a cross-section of a modification of the lower tip or guard.

This invention is designed to provide eyeglasses with simple and neat nose-clasping devices of such construction that a rigid nose-bridge may be employed, thus doing away with the usual spring-bows for connecting the lenses, that will permit the glasses to be applied properly and easily with but one hand, that will be inexpensive to make, that may be applied to the ordinary spectacles now on the market and thus avoid the necessity of employing the usual ear-hooks for holding the lenses on the nose, that will insure the glasses setting much more comfortably on the nose and thereby permit persons to wear them that are now so discommoded by the ordinary spring bow glasses as to be compelled to use spectacles, that will more effectually and more properly hold the glasses on the nose that may be readily repaired, and that will have other, minor advantages hereinafter set forth.

Referring to the drawing by letters, *a* designates the lenses which are connected together by a rigid nose bridge *b* of the form ordinarily used in spectacles. Preferably rigidly clamped in place against each lens mounting is a bracket comprising bracket arm *e* carrying a bearing piece or upright pivot pin *f* at its free end. It is preferred to secure the brackets to the eyeglass mounting by means of the lens fasteners which in the present instance are the ordinary lens screws *c* and nuts *d*. The clamped end of the bracket *e* is folded or bent upon itself to form an eye *g*, through which the screw *c* passes and a pair of arms *h* which extend inward far enough and are separated sufficiently to receive between them and to clasp the adjacent horizontal part of the nose-bridge, and the lower one of these arms *h* is extended inward and forward and has its extremity formed into the straight upright pivot pin *f*. These pivot pins incline upward and rearward and away from each other, so that they stand at an oblique angle not only to the median line of the glasses but also to the vertical plane thereof, as shown by the dotted lines in the various figures.

Pivotally mounted on each pivot *f* is a lever constructed, like bracket *e*, of a single piece of wire bent on itself about midway its length into a loop *i*, the two stands or arms thus formed having coincident eyes *j* formed in them for the reception of the pivot-pin and the two free end portions, beyond the eyes, being spread apart upward and downward and extended inward between the glasses and terminating at suitable points beyond the nose-bridge, the upper arm being provided at its extremity with a nose tip *k* and the lower one with a nose tip *l*. The ends of the arms carrying the trips *k* are bent toward each other so that the tips shall be directly opposite each other, and the bearing face of each tip is made unyielding and circular in shape and is cupped out; and the arms carrying the lower tips are extended downward and slightly away from each other, and the tip itself is approximately cone-shaped and provided with two or more (preferably three) longitudinal concaved sides or bearing faces *m*, or convexed sides *m'* as shown in Fig. 10. These tips *m* are pivotally mounted, so that they may rotate freely to bring any one of the sides *m* against the nose of the wearer. Any suitable means may be used to pivot the tips *l* on the depending ends of the wire arms, but I prefer to use a split elastic non-rotatable tube *n* adapted to be slipped on the end of the wire and flanged at its ends to receive the tip and prevent it slipping off but permit it to revolve freely. The loops *i* lie in front of the glasses and project outward and away from each other, so as to form convenient handles or finger pieces by which to manipulate the levers.

To press the opposite tips normally toward each other a suitable spring $p$ is employed, which consists of a piece of elastic wire formed at one of its ends into an eye through which the lens screw $c$ passes and which is clamped under nut $d$. From this eye the spring extends inward under the horizontal arm of the nose-bridge and upward to the upper arm of the adjacent lever, its upper end being provided with a hook or lug $p'$ to engage over said arm and press it downward and toward its opposite arm, whereby the tips will be kept normally pressed toward their companion tips at the opposite side and the lever will be held resiliently on its pivot-pin. At a point near the eye each spring is provided with a slight projection or offset, $p^2$ which lies between arms $h$ and prevents the spring working loose on its clamping screw and having pivotal motion.

These eyeglasses may be applied to the nose with but a single hand, it being simply necessary to grasp the finger-pieces $i$ between the thumb and forefinger of either hand and then spread the nose-tips by pressing the finger pieces toward each other. They may be removed in the same simple manner. Besides the advantage of thus quickly and properly placing the eyeglasses with but the use of one hand, these eyeglasses have many other advantages. Perhaps the most essential advantage is derived from inclining the pivot pins upward and away from each other, since by this arrangement the tips, as they approach each other, will move in planes ascending from the meridian line of the glasses, so that the moment the tips $k$ come in contact with the opposite sides of the nose they act as a fixed point and any further approximation of the tips will have a tendency to force the bridge downward more firmly on the nose and thereby overcome the tendency of the bridge to slide up on the nose. Another, and perhaps equally important, advantage lies in inclining the pivot pins upward and rearward at an oblique angle to the vertical plane of the glasses, so that they shall stand approximately parallel with the front line of the nose when the glasses are in use, as shown in Fig. 5, whereby a more extended movement of the lower tips will be permitted, it being obvious that were the pivot pins at right angles to the plane of the glasses or bent in the opposite direction the lower tips would come very nearly in line with the axis of their rotation and hence have but little movement. Again, with my improvements, the ordinary rigid saddle bridge employed on spectacles may be used, with the consequent advantages of nicety in regulating the pupilary distance; in fact, my device may be readily applied to spectacles of the ordinary make without any change whatever in the construction thereof, thus doing away with the usual ear-hooks attached to the outer ends of the lenses. Another feature lies in employing springs so constructed and arranged that they not only cause the companion nose-tips to normally approximate each other but also resiliently hold the levers down on their pivots, whereby all looseness of fit will be taken up and the levers will be prevented from rattling and will work properly without nicety of manufacture. The advantage of cupping the unyielding bearing face of the upper tip is that it will raise a corresponding elevation of the skin of the nose to fit the cup, thereby not only giving additional security against slipping but also a minimum of bearing surface with a consequent lessened tendency to irritation of the skin of the wearer; and the simplicity of attachment of the tip enables a broken tip to be replaced with ease, simply a little cement being used to hold the tip on the end of the wire.

The lower tip $l$ is especially adapted to press against the sloping sides of the nose below the bridge. It is tapered upward and provided with two or more sides which are grooved longitudinally to more effectually prevent slipping, or are convexed as shown in Fig. 10 to obtain a broader bearing surface. It is rotatably mounted so that its bearing surfaces will readily adjust themselves to the sides of the nose, thereby securing an effectual and comfortable fit without nicety of adjustment in the manufacture and assembling of the parts. By means of the removable frictional split tube $n$ on which the tip is mounted the tip may be readily renewed when broken, as it is simply necessary to slip the tip endwise off the wire arm and replace it with another. It will be observed that this advantage of ease of replacement of broken or lost parts applies to all the parts, as they are so constructed that they may be separately removed for renewal or repair, &c. It will be seen also that this device may be made inexpensively as great nicety of construction will not be necessary, and also that there will be little or no vibration or rattling although the parts be constructed without great accuracy. A further point is that the device is so constructed that the supporting part of the nose-guards may be attached to the lens frames by means of the usual lens holding screws, and the clamping nut $d$ forms a check or lock nut for the usual lens-clamping nut (not shown) and prevents it loosening; and, further, that my construction is neat in appearance as very little of the mechanism is visible from the front when the glasses are in place on the nose. It will be seen further that my idea of using two separated bearing surfaces for each member of the guard or clasp and making them movable in unison is greatly advantageous over the common practice of using a guard having a single continuous bearing surface. In the latter it is impossible to have a firm bearing surface the whole length of the guard on account of the bony prominences of the nose, and the center of pressure must therefore be restricted to one point and that point will most likely be in the middle of the bearing surface of the guard, where it will do the least good; whereas by using a small bearing surface above the bridge and another below it with an open space between to admit of any bony irregularities of the nose security and comfort are obtained, and even though the two tips do not touch the nose at the same moment in placing the glasses (because of inaccuracy of adjustment) there is sufficient resiliency in the lever arms to insure both tips coming into firm contact. It will be observed further that by making the lower tips movable with the upper tips all stretching of the skin across the nose (such as would result were these lower tips made stationary) is avoided, thus insuring a more comfortable and secure attachment of the glasses to the nose, as such stretching of the skin would no doubt result in both discomfort and insecurity as the stretched skin would tend to throw the glasses forward off the nose.

It will be observed that the essential feature of the upper tip is that its bearing surface is comparatively rigid and of a ring-like formation so that it will cover the largest possible area of skin with the least possible area of actual contact and will also press up an elevation in the skin which will enter the cup or ring and thereby most effectually secure the glasses in place. As to the lower tips it will be observed that it is essential that they rotate freely so that they will automatically, by mere contact with the nose, adjust themselves to the opposite sides of the nose when the glasses are put in place.

While I claim and desire to cover the details of construction herein shown and described I wish it understood that I do not confine myself in this respect as many changes may be made without departing from the invention in the least.

Having thus fully described my invention what I claim and desire to obtain by Letters Patent is,

1. An eyeglass mounting embodying a bridge, a nose-guard having nose engaging portions in rear of the lenses and mounted to swing substantially in a horizontal plane relatively to the bridge, and a spring loop arranged between the guard and another part of the mounting and having one end rigidly secured and its other end sliding freely.

2. In eyeglasses, the combination with a pair of glasses and a bridge, of a pair of nose-guards movably supported thereon and spring actuated, each nose-guard carrying a bearing tip above the bridge and a bearing tip below the bridge, the bearing tip below the bridge being rotatable and having two or more bearing sides.

3. In eyeglasses, the combination of a pair of lenses and a bridge, a pair of nose-guards each carrying a pair of separated bearing points one below the other, the lower one being mounted rotatably and tapered upward and provided with two or more concaved sides.

4. In combination, a pair of lenses, a rigid bridge, lens mountings connected to the bridge, fasteners securing the lenses to the lens mountings, a pair of vertically arranged pivots attached to the lens mountings by said fasteners in order to be independently removable therefrom, and spring-actuated nose-guards having forwardly extending operating portions pivoted on these pivots for the purpose set forth.

5. In eyeglasses, the combination with a pair of lens mountings, and a bridge connecting them, of lens screws, a nut on one end of each lens screw, an arm carrying a pivot pin, clamped between each of said nuts and a lens mounting, and a nose-guard pivoted on each of said pivots.

6. In eyeglasses, the combination with a pair of lens mountings, and a bridge connecting them, of lens screws for said mountings, arms each formed with an eye through which one of the screws passes and carrying an upright pivot, a nut on each of said screws adapted to clamp one of the eyes to a lens mounting, and a nose-guard pivotally supported on each pivot.

7. In combination with a pair of glasses and a nose-bridge connected to the glasses by a screw clamp, of a pair of nose-guards, a pair of pivots for supporting the nose-guards, an actuating spring for each nose-guard, and means whereby the pivots and the actuating springs are removably supported by the clamp screws of the lens mountings.

8. In combination with a pair of glasses and a connecting bridge, of a pivot pin supported at each end of the bridge and inclined upward and rearward, and a nose guard pivoted on each of said pins and provided with a pair of separated bearing tips.

9. In combination, a pair of glasses and a connecting bridge, of a pair of pivot pins inclining upward and rearward and a pair of spring-actuated nose-guards mounted on said pins for the purpose set forth.

10. In combination, a pair of glasses and a connecting bridge, a pair of pivot pins inclining upward and away from each other and supported one at each end of the bridge, and a nose-guard pivoted on each of said pins, for the purpose set forth.

11. In combination with a pair of glasses and a connecting bridge, of a pair of pivot pins supported in front of the bridge and inclining upward and rearward and away from each other and a nose-guard pivoted on each of said pins and carrying a pair of separated bearing tips one above the bridge and one below it.

12. In combination, a pair of lenses, a bridge, lens-mountings connected to the bridge and to the adjacent edges of the respective lenses, a screw passing through each lens-mounting and its lens, and a pair of nose-guards each having a supporting part clamped to the lens mounting adjacent to the face of one of the lenses by the same screw that secures the lens-mounting to the lens.

13. In combination, a pair of lenses, a bridge, lens mountings connected to the bridge and to the adjacent edges of the respective lenses, a screw passing through each lens-mounting and its lens, and a pair of nose-guards each having a supporting part clamped to the lens mounting adjacent to the rear face of one of the lenses by the same screw that secures the lens-mounting to the lens.

14. In eyeglasses, the combination with a bridge and a lens mounting, of a fastener for securing a lens to the mounting, a pivotally mounted nose-guard, and a spring for positioning the guard, secured by the lens fastener.

15. In eyeglasses, the combination with a lens mounting, and a screw for fastening the same, of a pivotally mounted nose-guard, and a spring for positioning the nose-guard having an eye through which the lens screw passes.

16. In eyeglasses, the combination with a lens mounting, a lens and a fastener for securing the lens thereto, of a pivotally mounted nose-guard, and a spring for positioning the guard, secured by the lens fastener and arranged in rear of the lens.

17. In eyeglasses, the combination with a lens mounting, and a bridge, of a bracket secured to the rear face of the lens mounting and extending inwardly and forwardly, a nose-guard, an upright pivot connecting the forward end of the bracket and the nose-guard, and a spring for positioning the nose-guard.

18. In eyeglasses, the combination with a lens mounting and a bridge, of a bracket secured to the rear face of the lens mounting and extending inwardly and forwardly under the bridge, an upright pivot arranged on the forwardly extending portion and in front of the bridge, and a nose-guard mounted on the pivot.

19. In eyeglasses, the combination with a lens mounting and a bridge, of a pair of suitably mounted pivots inclining upwardly and away from each other, and nose-guards mounted on the pivots and each having a forwardly extending finger piece and nose grips aranged in rear of the pivots.

20. In eyeglasses, the combination with the lens mounting and a bridge, of a pair of suitable pivots inclined outwardly and upwardly, and a nose-guard mounted on the pivots and each having a forwardly extending finger piece and nose grips arranged in rear of the pivots.

21. In eyeglasses, the combination with the lens mounting and a bridge, of a pair of pivots arranged at an oblique angle to the median line of the glasses and also to the vertical plane thereof, and nose-guards mounted on the pivots and each having a forwardly extending finger piece and nose grips arranged in rear of the pivots.

22. In eyeglasses, the combination of a bracket comprising an eye, a pair of inwardly extending arms, a forward extension on one of the said arms, and an upright pivot carried by the forward extension, with a nose-guard mounted on the upright pivot.

23. In eyeglasses, the combination with a lens mounting and a bridge, of a pivotally mounted nose-guard having a forwardly extending loop forming a finger piece.

24. In eyeglasses, the combination with a lens mounting and a bridge, of a pivotally mounted nose-guard embodying a single strip of material having a forwardly extending loop formed by bending the material about midway of its ends, the rear extremities of the strip being provided with nose tips.

25. In eyeglasses, the combination with a lens mounting and a bridge, of a pivotally mounted nose-guard embodying a single strip of material having a forwardly extending loop, coincident eyes forming the bearing for the guard and free end portions spread apart and carrying nose engaging portions.

26. In eyeglasses, the combination with a lens mounting and a bridge, of a bracket engaging one of said parts, a fastener securing a lens to the lens mounting and engaging the bracket, and a nose-guard carried by the bracket.

27. In eyeglasses, the combination with a lens mounting and a bridge, of a fastener for securing a glass to the lens mounting, a bracket secured by the lens fastener and engaging the bridge, and a nose-guard carried by said bracket.

28. In eyeglasses, the combination with a lens mounting and a bridge, of a bracket engaging above and below one of said parts, a fastener securing a lens to the lens mounting and engaging the bracket, and a nose-guard carried by the bracket.

29. In eyeglasses, the combination with a lens mounting, a bridge, and a fastener for securing a lens to the mounting, of a nose-guard having an operating arm, and a bracket for the guard secured by the lens fastener.

30. In eyeglasses, the combination with a bridge and a lens mount, of a pivotally mounted nose-guard having a rearwardly extending arm carrying a nose engaging tip, and a spring arm to position the guard having a sliding engagement at its free end with the arm of the nose-guard.

31. In an eyeglass mounting, the combination with a detachable bracket having an attaching eye and means for securing it, of a nose guard mounted to swing on the bracket and having a forwardly extending finger piece and a rearwardly extending portion having a nose engaging tip.

32. In eyeglasses, the combination with a bridge, a lens mounting and a suitably supported bearing, of a nose-guard having a bearing detachably engaging with the first named bearing, and a spring for positioning the guard having one end rigidly secured and the other end slidably engaging a part to retain the bearings in coöperative relation.

33. In eyeglasses, the combination with a bridge, a lens mounting and a suitably supported bearing, of a nose-guard having a bearing detachably engaging the first named bearing, and provided with a forwardly extending finger piece and a rearwardly extending arm, and a spring arm, slidably engaging the rearwardly extending arm and acting to retain the bearings in coöperative relation.

34. In eyeglasses, the combination with the lenses, of a bridge connecting them, pivotal arms extending transversely of the plane of the lenses and having bearing portions at their rear ends and operating portions at their forward ends, and springs arranged between the guards and the mounting having looped portions extending rearwardly of the lenses and having also a sliding connection with one of the parts.

35. In eyeglasses, the combination with the lenses, the bridge connecting them, of pivotally mounted arms extending transversely of the plane of the lenses having the operating portions in front of the bridge and the nose engaging portions in rear thereof, springs located in rear of the lenses having vertically extending and outwardly yielding free ends having sliding engagement with the pivoted arms.

36. In eyeglasses, the combination with the nose bridge, the nose-guards pivotally supported near the ends of the bridge to move to and from each other, of a spring for each nose-guard supported independently of the support of the nose-guard and held at one end and engaging the nose-guard at its other end.

37. In eyeglasses, the combination with a lens mounting and a bridge, of a looped spring extending rearwardly and thence forwardly and a pivotally mounted nose-guard engaged by the end of the forwardly extending portion.

38. In eyeglasses, the combination with a lens mounting and a bridge, of a spring extending rearwardly from one of said parts and thence forwardly, and a pivotally mounted nose guard engaged by the free end of the forwardly projecting portion of the spring.

39. In eyeglasses, the combination with a bridge, a lens mounting and a nose-guard, of a spring extending rearwardly from one of said parts and thence forwardly and engaging another of said parts to position the nose-guard.

40. In eyeglasses, the combination with a bridge, a lens mounting and a nose guard, of a rearwardly extending spring loop secured at one end to one of said parts and engaging another of said parts to position the nose-guard.

41. In eyeglasses, the combination with a bridge, a lens mounting and a nose guard, of a horizontally arranged loop secured at one end to one of said parts and engaging another of said parts to position the nose-guard.

42. The combination with the lenses and lens mountings, of a practically inflexible bridge having its ends secured to the mountings, levers crossing the vertical plane of the lenses, pads carried by the rearwardly-projecting arms of the levers, U-shaped springs located in rear of the vertical plane of the lenses, and interposed between the mountings and the rear arms of the lever, each of said springs being permanently attached at one end and at the other end having frictional contact with the coöperating part, substantially as set forth.

43. In eyeglasses, the combination with the lenses, the bridge, and the nose-guards pivotally supported at the ends of the bridge and crossing the vertical plane of the lenses, of independent springs for the nose-guards rigidly supported at the ends of the bridge, and extending at right angles to the plane of the lenses, and exerting their pressure between the fulcrum and the rear ends of the nose guards, substantially as described.

44. The combination with a bridge, a lens mounting and a fastener for securing a lens thereto, of a bracket also held by said fastener and a nose-guard mounted to swing in a horizontal plane on said bracket and having a forwardly extending finger piece.

45. The combination with a bridge, and a lens mounting, of a bracket arranged on the rear face of the mounting, a nose-guard mounted to swing on the bracket in a horizontal plane and having a finger piece, and a fastener for securing the lens mounting and the bracket to a lens.

46. The combination with a bridge, a lens mounting and a lens, of a fastener for securing one of said parts to another, a bracket also held by said fastener, and a nose guard mounted to swing on the bracket and having a finger piece.

47. The combination with a lens mounting and a substantially rigid bridge, of a bracket, a fastener securing the bracket to one of said parts, a nose guard mounted to swing substantially in a horizontal plane about an axis located in a vertical plane to one side of the vertical plane of the fastener, and a spring for moving the guard toward the nose.

48. An eyeglass mounting embodying a nose-guard mounted to turn about an axis arranged at an oblique angle to the plane of lenses held by the mounting, and embodying upper and lower nose grips arranged in rear of the plane of the lenses.

49. The combination with a bridge, of a nose guard embodying upper and lower pads, and a pivot for the guard arranged at an oblique angle to the plane of the lenses and having its lower end in a plane in front of its upper end.

In testimony whereof I hereunto affix my signature in the presence of two witnesses this 19th day of June 1901.

EDWARD H. SCHILD.

Witnesses:
CHARLES H. MILLIKIN,
C. REINHARD.